United States Patent
Chen

(10) Patent No.: US 11,278,122 B2
(45) Date of Patent: Mar. 22, 2022

(54) COLLAPSIBLE HEADBOARD

(71) Applicant: House & Home Co, Ltd., Fujian (CN)

(72) Inventor: Xusheng Chen, Xiamen (CN)

(73) Assignee: HOUSE & HOME CO, LTD., Fujian (CN)

(*) Notice: Subject to any disclaimer, the term of this patent is extended or adjusted under 35 U.S.C. 154(b) by 0 days.

(21) Appl. No.: 17/024,663

(22) Filed: Sep. 17, 2020

(65) Prior Publication Data
US 2021/0378409 A1 Dec. 9, 2021

(30) Foreign Application Priority Data
Jun. 3, 2020 (CN) .......................... 202020999526.6

(51) Int. Cl.
*A47C 19/04* (2006.01)
*F16B 12/56* (2006.01)

(52) U.S. Cl.
CPC ............. *A47C 19/04* (2013.01); *F16B 12/56* (2013.01)

(58) Field of Classification Search
CPC ... A47C 19/022; A47C 19/005; A47C 19/027; A47C 19/04; A47C 7/407; A47C 7/42; A47C 7/0506; A47C 19/02; A47C 19/021; F16B 12/10; F16B 12/56; F16B 2012/106; F16B 12/60; F16B 5/12; F16B 5/0004; F16B 5/00
See application file for complete search history.

(56) References Cited

U.S. PATENT DOCUMENTS

| | | | | |
|---|---|---|---|---|
| 819,631 | A * | 5/1906 | Bollinger | A47C 19/04 5/183 |
| 5,557,817 | A * | 9/1996 | Haddock | A61G 7/0507 5/425 |
| 9,526,328 | B2 * | 12/2016 | Illulian | A47B 3/083 |
| 10,842,283 | B2 * | 11/2020 | Schachter | A47C 19/021 |
| 2003/0127890 | A1 * | 7/2003 | Moon | A47C 19/022 297/228.1 |
| 2009/0288253 | A1 * | 11/2009 | Jin | A47C 19/022 5/282.1 |
| 2014/0000038 | A1 * | 1/2014 | Oyo-Hoffmann | A47C 19/022 5/658 |
| 2016/0045033 | A1 * | 2/2016 | Gioe | A47C 19/022 5/280 |
| 2017/0164767 | A1 * | 6/2017 | Serafini | A47G 9/02 |

FOREIGN PATENT DOCUMENTS

DE 202017107458 U1 * 1/2018 ............. A47C 19/02

* cited by examiner

*Primary Examiner* — Robert G Santos
*Assistant Examiner* — Alison N Labarge
(74) *Attorney, Agent, or Firm* — Leong C. Lei

(57) ABSTRACT

A collapsible headboard includes a left headboard, a right headboard, and a middle filling part between the left and right headboards. Respective fronts of the left and right headboards and the middle filling part are provided with cushions. A front of the collapsible headboard is connected with a headboard covering located on outer sides of the cushions. Backs of the left and right headboards are provided with at least one transverse connecting rod. The transverse connecting rod is connected to the backs of the left and right headboards and the middle filling part. The collapsible headboard can be assembled and disassembled easily.

8 Claims, 5 Drawing Sheets

COLLAPSIBLE HEADBOARD

BACKGROUND OF THE INVENTION

1. Field of the Invention

The present invention relates to a bed headboard, and more particularly to a collapsible headboard.

2. Description of the Prior Art

In general, a conventional bed headboard is in a one-piece structure, especially a headboard having a soft backing. This kind of headboard is bulky and heavy, so it is inconvenient to disassemble, assemble and transport.

Especially, it occupies a lot of space in transportation, and the logistics cost is high, so it doesn't meet the needs of the market. Accordingly, the inventor of the present invention has devoted himself based on his many years of practical experiences to solve these problems.

SUMMARY OF THE INVENTION

The primary object of the present invention is to provide a collapsible headboard to solve the problems of large volume, inconvenient disassembly and assembly, and high logistics cost of the conventional one-piece headboard.

In order to achieve the above object, the present invention adopts the following solutions.

A collapsible headboard comprises a left headboard, a right headboard, and a middle filling part between the left and right headboards. Fronts of the left and right headboards and the middle filling part are provided with cushions. A front of the collapsible headboard is connected with a headboard covering located on outer sides of the cushions. The headboard covering enables the left headboard and the right headboard to form a soft connection. Backs of the left and right headboards are provided with at least one transverse connecting rod. The transverse connecting rod is connected to the backs of the left and right headboards and the middle filling part.

Preferably, the middle filling part includes a vertical board arranged between the left and right headboards. A front of the vertical board is provided with a corresponding one of the cushions. Top and bottom of the vertical board are formed an upper lip and a lower lip that are flush with tops and bottoms of the left and right headboards.

Preferably, the headboard covering is stretched flat on the front of the collapsible headboard after the left and right headboards and the middle filling parts are joined together. A periphery of the headboard covering is connected to the front of the collapsible headboard. The headboard covering is provided with at least one pull tab extending outward and corresponding in position to the middle filling part. The pull tab is pulled back and connected to the middle filling part.

Preferably, the pull tab extends backward from an upper middle portion of the headboard covering. The periphery of the headboard covering is attached to front sides of the left and right headboards through hook-and-loop fasteners. A distal end of the pull tab is attached to the middle filling part through hook-and-loop fasteners.

Preferably, a middle portion of the transverse connecting rod and the middle filling part is formed with at least one locking point. Another locking point is formed between either end of the transverse connecting rod and the left headboard or the right headboard. Each locking point includes a first positioning hole formed on the transverse connecting rod. A screw is inserted through the first positioning hole and locked to a second positioning hole formed on the backs of the left and right headboards or the back of the middle filling part.

Preferably, the first positioning hole is in the form of a transverse slot, and a fastening plate is provided in front of the first positioning hole.

Preferably, the left and right headboards each include a backboard. Fronts of the backboards of the left and right headboards are provided with the corresponding cushions. A periphery of a back of each backboard extends backward to form a plurality of side boards that constitute a side frame and another side board that is attached and connected to either side of the middle filing part through at least one locking screw.

Preferably, a middle portion of the back of each backboard is provided with at least one middle longitudinal rod. Either end of the transverse connecting rod is locked to the middle longitudinal rod by a screw. The transverse connecting rod is further locked to the side board that is attached to either side of the middle filling part.

Preferably, the at least one transverse connecting rod includes two parallel transverse connecting rods arranged on a back of the collapsible headboard.

Preferably, the headboard covering is made of a leather or fabric material. After adopting the above structure, the collapsible headboard of the present invention is formed by combining the left headboard, the right headboard and the middle filling part. The back of the collapsible headboard after being assembled is fixed by the transverse connecting rod. When disassembling, the middle filling part is disengaged from the left and right headboards. The left and right headboards are folded to be small in size. After being disassembled, the collapsible headboard can be transported and packed more easily and conveniently, and it occupies a small space. This can reduce transportation costs.

DETAILED DESCRIPTION OF THE PREFERRED EMBODIMENTS

Embodiments of the present invention will now be described, by way of example only, with reference to the accompanying drawings.

Figure 1:
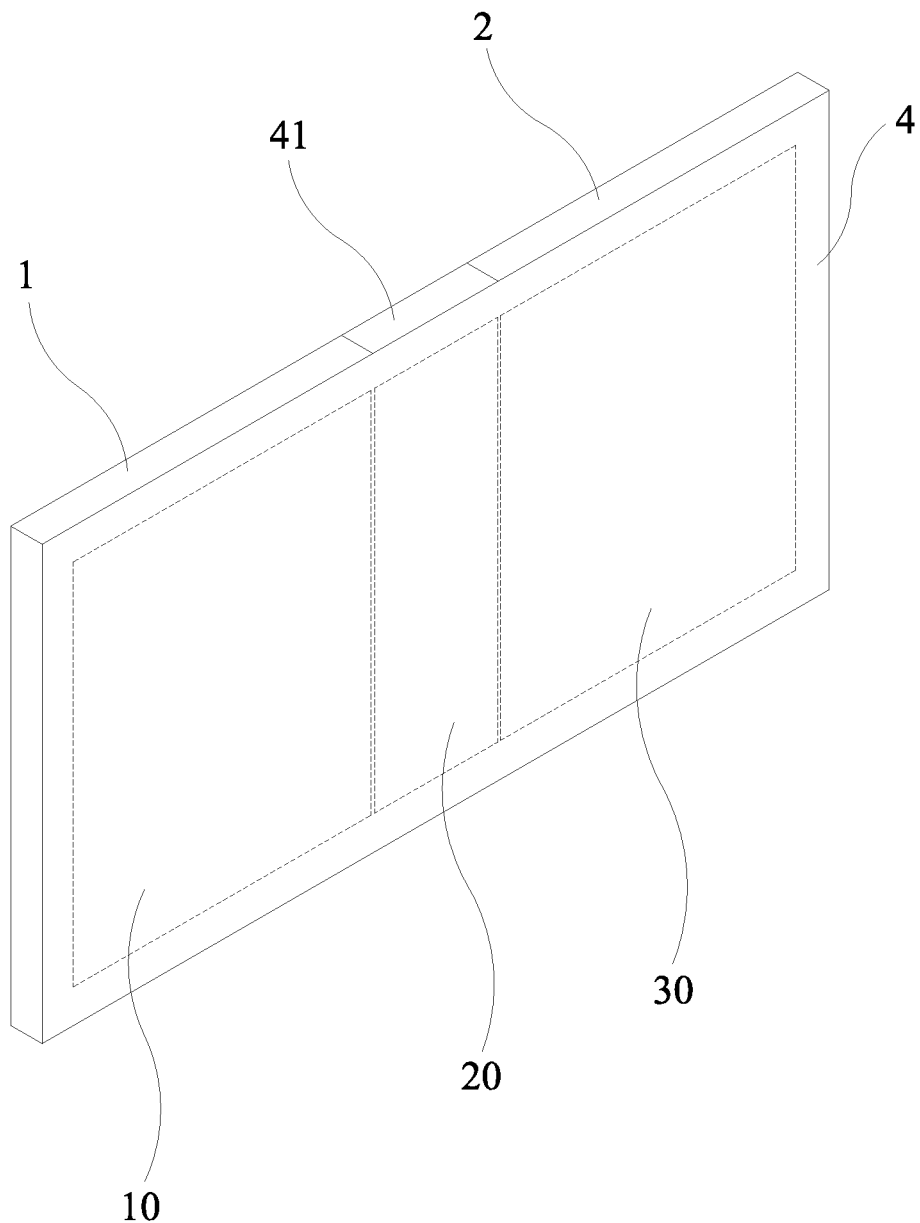
FIG. 1 is a perspective view of the present invention.
Figure 2:
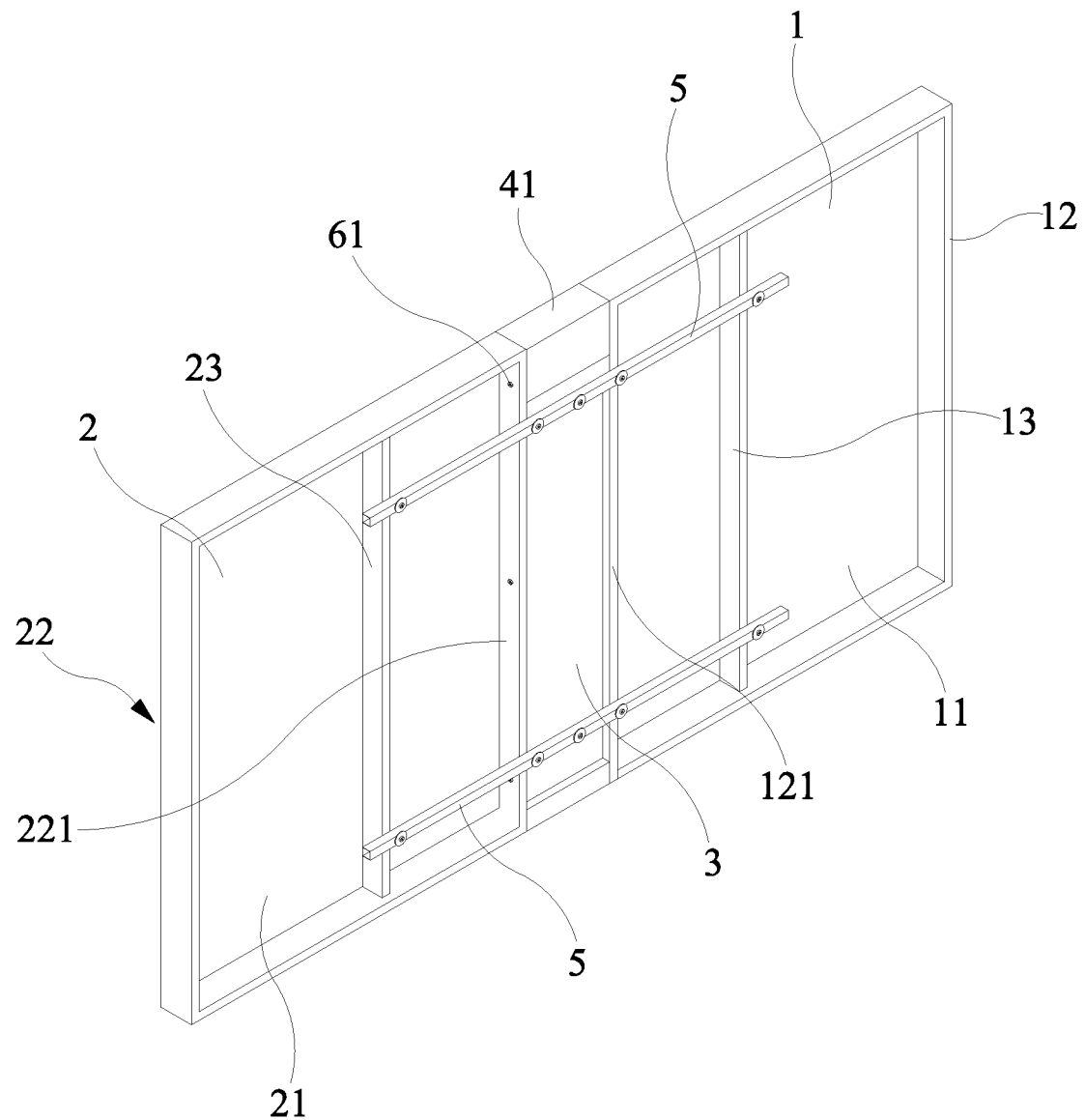
FIG. 2 is a rear view of the present invention.

As shown in FIG. 1 and FIG. 2, the present invention discloses a collapsible headboard. The collapsible headboard comprises a left headboard 1, a right headboard 2, and a middle filling part 3 between the left headboard 1 and the right headboard 2. The fronts of the left headboard 1, the right headboard 2 and the middle filling part 3 are provided with cushions 10, 20, 30 (shown by dotted lines in FIG. 1), respectively. The front of the collapsible headboard is connected with a headboard covering 4 located on the outer sides of the cushions 10, 20, 30. The headboard covering 4 is made of a leather or fabric material. The headboard covering 4 enables the left headboard 1 and the right headboard 2 to form a soft connection. At least one transverse connecting rod 5 is provided on the backs of the left headboard 1 and the right headboard 2. This embodiment has two parallel transverse connecting rods 5. Each transverse connecting rod 5 is connected to the backs of the left headboard 1, the right headboard 2 and the middle filling part 3, thereby fixing the left headboard 1, the right headboard 2 and the middle filling part 3 to form a whole headboard. The headboard covering 4 is stretched flat on the front of the collapsible headboard after the left and right headboards and the middle filling part are connected side by side.

Specifically, the left headboard 1 and the right headboard 2 are arranged symmetrically. The left headboard 1 and the right headboard 2 each include a backboard 11, 21. The fronts of the backboards 11, 21 of the left headboard 1 and the right headboard 2 are provided with the corresponding cushions 10, 20, respectively. The periphery of the back of each backboard 11, 21 extends backward to form a plurality of side boards that constitute a side frame 12, 22 and another side board 121, 221 that is attached and connected to either side of the middle filing part 3 through at least one locking screw 61, as shown in FIG. 2. The middle portion of the back of each backboard 11, 12 is provided with at least one middle longitudinal rod 13, 23. The two ends of the transverse connecting rod 5 are respectively locked to the middle longitudinal rods 13, 23 of the two backboards 11, 12 through screws. The transverse connecting rod 5 is further locked to the side board 121, 221 that is attached to either side of the middle filling part.

Figure 3:
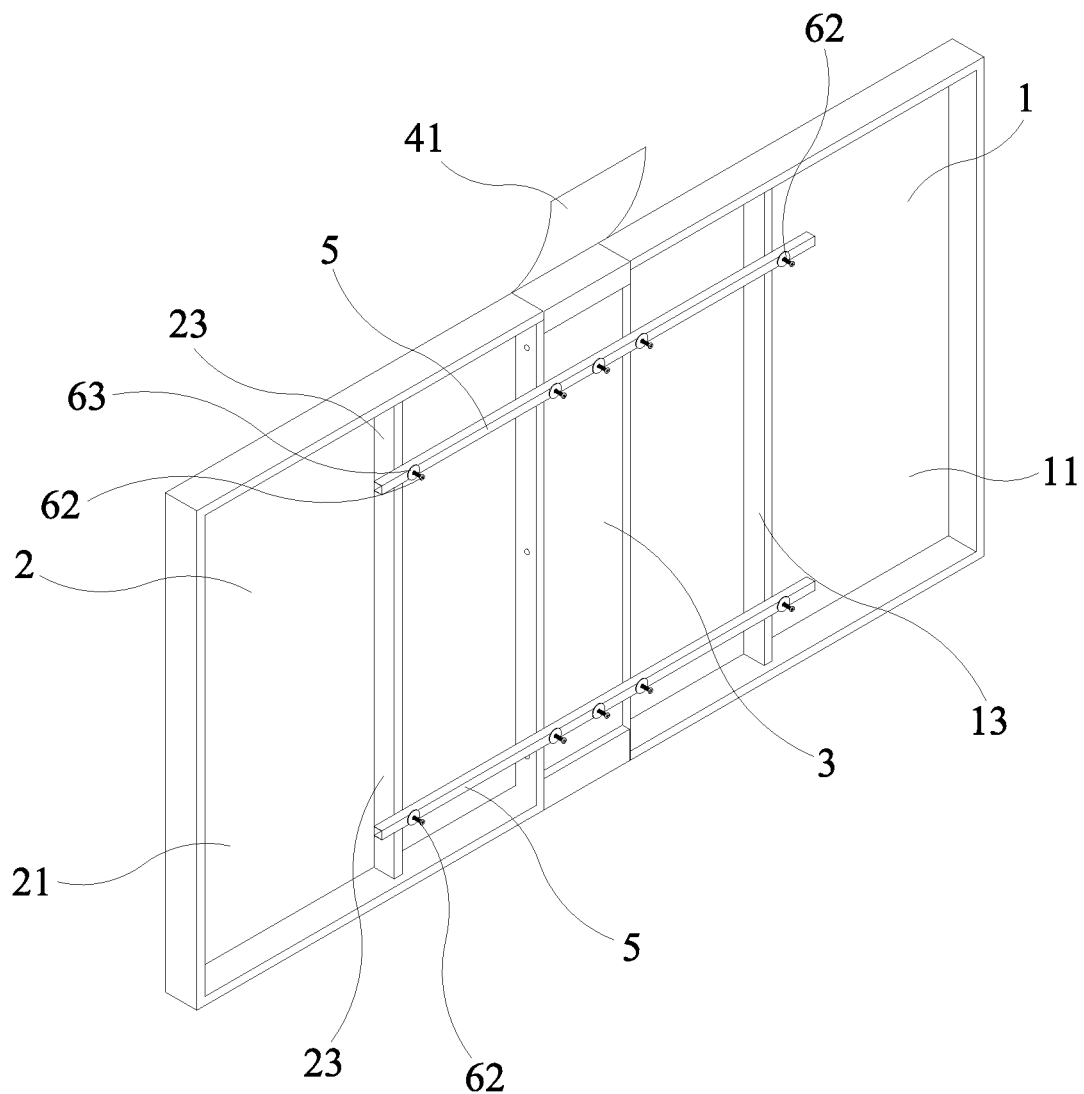
FIG. 3 is another rear view of the present invention, wherein the pull tab is opened.
Figure 3A:
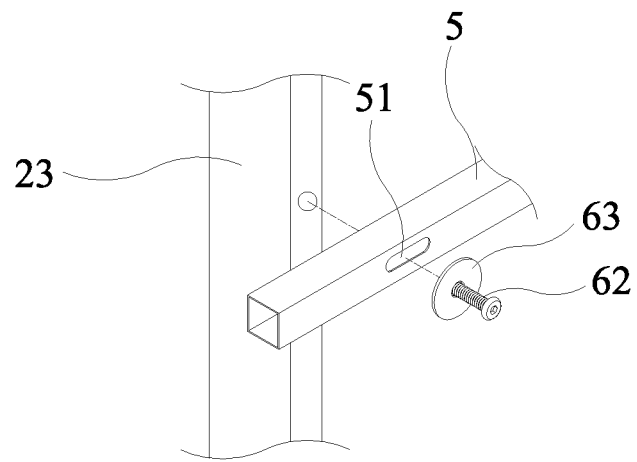
FIG. 3A is a schematic view showing that the transverse connecting rod in FIG. 3 is to be disassembled.
Figure 4:
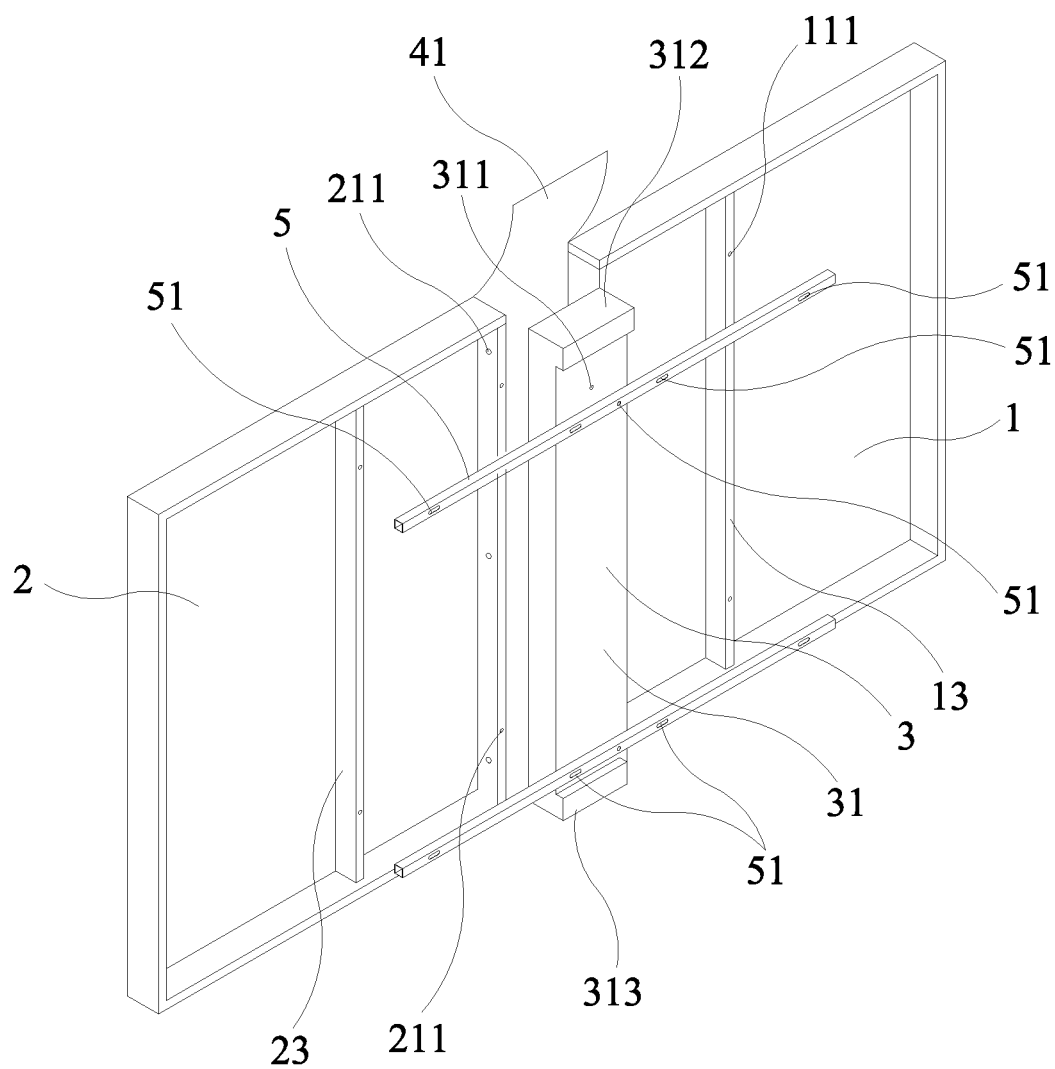
FIG. 4 is a schematic view of the present invention after being disassembled.

As to the connection between the transverse connecting rod 5 and the collapsible headboard, please refer to FIG. 3, FIG. 3A and FIG. 4. The middle portion of the transverse connecting rod 5 and the middle filling part 3 is formed with at least one locking point. At least one locking point is formed between either end of the transverse connecting rod 5 and the left headboard 1 or the right headboard 2. In this embodiment, each locking point includes a first positioning hole 51 formed on the transverse connecting rod 5. A second positioning hole 111, 211 is formed on the back of each of the left headboard 1 and the right headboard 2. The back of the middle filling part 3 is formed with a corresponding second positioning hole 311. Screws 62 are inserted through the first positioning holes 51 and locked into the corresponding second positioning holes on the backs of the left headboard 1 and the right headboard 2 or the back of the middle filling part 3. In this embodiment, the middle longitudinal rods 12, 23 of the left headboard 1 and the right headboard 2 are provided with the second positioning holes 111, 211, respectively. The side board 121, 221 that is attached to either side of the middle filling part 3 is formed with the second positioning hole 111, 211. The middle filling part 3 is also formed with the second positioning hole 311. The transverse connecting rod 5 is formed with five first positioning holes 51. Further, the first positioning hole 51 of the transverse connecting rod 5 is in the form of a transverse slot. As shown in FIG. 3, a fastening plate 63 is provided in front of the first positioning hole 51. The screw 62 is inserted through the fastening plate 63, the first positioning hole 51 and the corresponding second positioning hole in sequence. The screws 62 are locked into the first positioning holes 51, respectively. The first positioning hole is in the form of a transverse slot, so that the screw can move a certain distance during the locking process. It is easier to align the second positioning hole for positioning.

The middle filling part 3 includes a vertical board 31 between the left headboard 1 and the right headboard 2. The front of the vertical board 31 is provided with the cushion 30. The top and bottom of the vertical board 31 are formed an upper lip 312 and a lower lip 313, respectively. The upper lip 312 and the lower lip 313 are flush with the side boards located on the tops and bottoms of the left headboard 1 and the right headboard 2, as shown in FIG. 2. As shown in FIG. 1 through FIG. 4, when the collapsible headboard of the present invention is installed, the middle filling part 3 is placed between the left headboard 1 and the right headboard 2. The locking screws 61 are used to lock the middle filling part 3 to the sides of the left and right headboards 1, 2, and then the left and right headboards 1, 2 and the middle filling part 3 are connected and fixed together by the transverse connecting rod 5 to form an integrated headboard. The periphery of the headboard covering 4 is connected to the front of the collapsible headboard, and the headboard covering 4 is stretched flat on the front of the collapsible headboard after the left and right headboards and the middle filling parts are joined together. In order to prevent the middle portion of the headboard covering 4 from collapsing or being uneven, the headboard covering 4 is provided with at least one pull tab 41 extending outward and corresponding in position to the middle filling part 3. The pull tab 41 is pulled back and connected to the middle filling part 3, so that the headboard covering 4 can be flattened. In this embodiment, the pull tab 41 extends backward from the upper middle portion of the headboard covering 4 and is connected to the middle filling part 3. The pull tab 41 may be disposed at the lower middle portion of the headboard covering 4. The periphery of the headboard covering 4 can be attached to the front sides of the left headboard 1 and the right headboard 2 through hook-and-loop fasteners. The distal end of the pull tab 41 may also be attached to the middle filling part 3 through hook-and-loop fasteners.

As shown in FIGS. 2 to 4, when the collapsible headboard of the present invention is disassembled, the screws 62 on the transverse connecting rod 5 are unscrewed to release the connection of the left and right headboards 1, 2 and the middle filling part 3. The locking screws 61 are also unscrewed to separate the middle filling part 3 from the left and right headboards 1, 2. Because the left headboard 1 and the right headboard 2 are connected through the headboard covering 4, the left headboard 1 and the right headboard 2 can be easily folded and then stacked together.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A collapsible headboard, comprising a left headboard, a right headboard, and a middle filling part between the left and right headboards; fronts of the left and right headboards and the middle filling part being provided with cushions, a front of the collapsible headboard being connected with a headboard covering located on outer sides of the cushions, the headboard covering enabling the left headboard and the right headboard to form a soft connection, backs of the left and right headboards being provided with at least one transverse connecting rod, the transverse connecting rod being connected to the backs of the left and right headboards and the middle filling part; wherein a middle portion of the transverse connecting rod and the middle filling part is formed with at least one locking point, another locking point is formed between either end of the transverse connecting rod and the left headboard or the right headboard, each locking point includes a first positioning hole formed on the transverse connecting rod, and a screw is inserted through the first positioning hole and locked to a second positioning hole formed on the backs of the left and right headboards or the back of the middle filling part.

2. The collapsible headboard as claimed in claim 1, wherein the middle filling part includes a vertical board arranged between the left and right headboards, a front of the vertical board is provided with a corresponding one of the cushions, and top and bottom of the vertical board are formed an upper lip and a lower lip that are flush with tops and bottoms of the left and right headboards.

3. The collapsible headboard as claimed in claim 1, wherein the headboard covering is stretched flat on the front of the collapsible headboard after the left and right headboards and the middle filling parts are joined together, a periphery of the headboard covering is connected to the front of the collapsible headboard, the headboard covering is provided with at least one pull tab extending outward and corresponding in position to the middle filling part, and the pull tab is pulled back and connected to the middle filling part.

4. The collapsible headboard as claimed in claim 1, wherein the first positioning hole is in the form of a transverse slot, and a fastening plate is provided in front of the first positioning hole.

5. The collapsible headboard as claimed in claim 1, wherein the left and right headboards each include a backboard, fronts of the backboards of the left and right headboards are provided with the corresponding cushions, and a periphery of a back of each backboard extends backward to form a plurality of side boards that constitute a side frame and another side board that is attached and connected to either side of the middle filing part through at least one locking screw.

6. The collapsible headboard as claimed in claim 5, wherein a middle portion of the back of each backboard is provided with at least one middle longitudinal rod, either end of the transverse connecting rod is locked to the middle longitudinal rod by a screw, the transverse connecting rod is further locked to the side board that is attached to either side of the middle filling part.

7. The collapsible headboard as claimed in claim 1, wherein the at least one transverse connecting rod includes two parallel transverse connecting rods arranged on a back of the collapsible headboard.

8. The collapsible headboard as claimed in claim 1, wherein the headboard covering is made of a leather or fabric material.

* * * * *